United States Patent [19]

Ackermann et al.

[11] Patent Number: 4,975,103

[45] Date of Patent: Dec. 4, 1990

[54] PROCESS FOR PRODUCING A PLANAR GLASS SUBSTRATE COATED WITH A DIELECTRIC LAYER SYSTEM

[75] Inventors: Ulrich Ackermann, Mainz-Gonsenheim; Heinz-Werner Etzkorn, Neu-Ansbach; Ralf T. Kersten, Bremthal; Volker Paquet; Uwe Ruetze, both of Mainz, all of Fed. Rep. of Germany

[73] Assignee: Schott Glaswerke, Mainz, Fed. Rep. of Germany

[21] Appl. No.: 403,967

[22] Filed: Sep. 7, 1989

[30] Foreign Application Priority Data

Sep. 7, 1988 [DE] Fed. Rep. of Germany ....... 3830364

[51] Int. Cl.$^5$ ...................... C03B 9/31; C03C 17/245
[52] U.S. Cl. ........................ 65/18.2; 65/29; 65/105; 65/112; 427/167
[58] Field of Search ............... 427/165, 166, 167, 366; 65/18.2, 108, 110, 3.12, 60.2, 60.53, 60.8, 60.1, 29, 105, 112

[56] References Cited

U.S. PATENT DOCUMENTS

| | | | |
|---|---|---|---|
| 1,776,574 | 9/1930 | Arrault et al. | 65/108 |
| 3,879,182 | 4/1975 | Strach | 65/102 |
| 4,221,825 | 9/1980 | Guerder et al. | 427/167 |
| 4,308,316 | 12/1981 | Gordon | 427/167 |
| 4,363,647 | 12/1982 | Bachman et al. | 65/18.2 |
| 4,417,914 | 11/1983 | Lehrer | 65/18.2 |

FOREIGN PATENT DOCUMENTS

| | | |
|---|---|---|
| 2313203 | 10/1973 | Fed. Rep. of Germany. |
| 2328930 | 1/1974 | Fed. Rep. of Germany. |
| 2134099 | 8/1984 | United Kingdom ................ 65/60.8 |

*Primary Examiner*—David L. Lacey
*Assistant Examiner*—Todd J. Burns
*Attorney, Agent, or Firm*—Millen, White & Zelano

[57] ABSTRACT

A process is provided for producing a planar glass substrate coated with a dielectric layer system in which the individual layers are formed by a chemical vapor deposition coating process. After the layers have been applied, the glass substrate is either drawn, compressed, or its surface enlarged until the coating layers are reduced in thickness. A planar glass substrate having a multiplicity of extremely thin dielectric layers can be fabricated according to this process.

6 Claims, No Drawings

PROCESS FOR PRODUCING A PLANAR GLASS SUBSTRATE COATED WITH A DIELECTRIC LAYER SYSTEM

BACKGROUND OF THE INVENTION

The invention relates in general to a process for producing a planar substrate coated with a plurality of thin dielectric layers (multilayer system) and, more particularly, to a process for reducing the thickness of dielectric layers to alter the optical properties thereof.

STATE OF THE ART

Planar glass suhstrates coated with dielectric multilayer systems are used as reflecting, reflection-reducing, or polarizing optical systems, as interference filters, and as beam splitters. Normally, vapor deposition and sputtering techniques are used to form the layers. Other conventional processes for coating the planar glass substrate include electron beam vaporization, ion plating, sputtering, ion beam sputtering, ion beam assisted deposition, etc. Also known are immersion processes for applying the layers. A disadvantage in using these processes is that the properties of the applied coating do not always correspond to those of the solid coating material before its application. Other disadvantaqes are impurities in the layers coming from the crucible material, faults in the boundary structure, and non-homogenous areas in the coating. As a result, glass substrates coated by these processes can have optical properties which are impaired, i.e., by absorption, scattering, and depolarization.

It is known from the production of glass fibres that dielectric layers of the highest quality can be deposited by chemical vapor deposition (CVD) processes. These processes, which are well known, are described, for example in Pure & Appl. Chem., Vol. 57, No. 9, pp. 1299–1310, 1985; Journal of the Electrochemical Society, Vol 123, No. 7, July 1976, pp. 1079–1083, Tingye Li, Optical Fiber Communication, Vol 1,Fiber Fabrication, Academic Press FNC (1985), as well as in EP-OS 5963, GB-OS 20 79 267, and U.S. Pat. Nos. 4.282.035 and 4,340,582.

The modified chemical vapor deposition (MCVD) processes for coating the inside wall of a glass tube are described in Glass Science and Technology, Vol. 1, ed. Uhlman and Kreidl, Academic Press, 1983.

The application of dielectric layers to produce reflecting, anti-reflecting, polarizing, etc. optical elements is known per se and described exhaustively in e.g., the standard work, Anders, Dunne Schichten fur die Optik (Thin layers for Optics), Wissenschaftl. Verlags-GmbH, Stuttgart, 1965.

The optical porperties of a coated glass substrate are dependent in part on the thickness of the individual layers. For wavelengths in the range of from about 0.4–1.6 micrometers, the layers which can be formed by these known processes are, in general, too thick. Since the optical properties depend on the thickness of the individual layers, for some applications, it is often necessary to apply to a glass substrate coating layers having different thickness of dielectric materials. This procedure is, however, relatively expensive, because it requires resetting and/or adjustment of the coating equipment each time a different layer thickness is applied. It is known to make windows by cutting a glass tube longitudinally and then pressing the softened glass until it is flat ("ironing-out"). It is also known that the thickness of glass article can be reduced by a drawing operation. In addition, it is known that a coated glass substrate can be drawn and elongated It was not, however, thought possible to use such a drawing process in the production of planar multilayer systems where the coating was of optical quality because the known processes of fiber production operate in one dimension only.

It is, therefore, desirable to have a process in which dielectric layers on a planar glass substrate can be reduced in thickness so that they are still effective in a wavelength range of from about 0.4–1.6 micrometers. It is also desirable to have a process in which adjustments can easily be made to vary the thickness of the individual dielectric layers on a glass substrate without altering the properties of the layered materials, in comparison with corresponding solid material before it is applied as a coating.

Summary of the Invention

According to the invention, it has been discovered that an article comprising a glass substrate coated by the CVD or MCVD processes with a dielectric layer system can be drawn and elongated to reduce the thickness of the individual layers in the same ratio as the thickness of the glass substrate, without impairing the optical properties of the article.

In a preferred aspect of the invention, dielectric multilayer systems can consist of a number of less than 10 to well over 1,000 individual layers, more advantageously from about 100 to 1000 layers. The extent to which a glass substrate coated with a dielectric layer system can be drawn and elongated depends, on the one hand, on the gauge or thickness of the glass substrate and, on the other hand, on the thickness of an individual dielectric layer. The extent to which such coated glass substrate can be drawn can be determined by routine tests on samples of the coated substrate to be drawn.

Preferred dielectric layer systems which can be reduced in thickness according to the present invention are alternating layers of fluorine doped $SiO_2$ (0,5 mol-% F.) and Ge and fluorine doped $SiO_2$ (0,5 mol-% F. and about 10 to 20 mol-% Ge) or alternating layers of pure $SiO_2$ and fluorine doped $SiO_2$ (about 2 mol-% F.) or alternating layers of borosilicate glasses, which differ slightly in the refractive index. Generally the viscosity behavior of the layers should be adapted to the temperature/viscosity-curve of the substrate, e.g. layers consisting essentially of $SiO_2$ are well suited for use on a fused silica substrate.

Preferred glass substrates wich can be coated and then treated according to the process of the present invention are fused silica (quartz glass), high temperature melting borosilicate glass and all other high temperature melting glasses which can be coated and which do not belong to the so called short glasses.

In the case of the normally employed thickness of glass substrates of from about 1–10 mm, having individual layer thicknesses of from about 10–10 micrometers, the drawing operation preferably reduces the thickness of the coating to no more than 1/20 of the original coating thickness. Although the drawing process can be used to reduce the coating thickness by any desired degree, it is only in exceptional cases that the reduction in thickness to only about one-half or more of its original thickness is justified due to the expense of the drawing operation. In a preferred aspect, the coated substrate is drawn only to the extent that the resulting individual dielectric layer is reduced to about 0.05 to 1 micrometer of thickness. If the article is drawn any further, i.e., to less than about 1/25, the danger exists that faults or ruptures will appear in one or more of the dielectric layers. Techniques which are known for drawing glass per se can be adapted for drawing the coated glass substrates of the present invention.

For example, the coated glass to be treated can be softened by heating, but the temperature should preferably be kept low enough to avoid permanently impairing the optical properties of the coating.

The temperature may not be so high, that diffusion of the refractive index changing components of the layers and thereby reducing of the refractive index difference between the layers occurs.

According to the present invention, a coated planar glass substrate, e.g., a coated disc, can also having its coating reduced in thickness by rolling the softened glass substrate between polished rollers, pressing between polished plates, or "ironing-out" the glass substrate. When a glass tube coated on one or both sides is treated according to the process of the present invention, it is preferred to expand the tube and thereby increase the cross-sectional area. The tube can be expanded by blowing, a process known for hundreds of years.

In another embodiment, it is preferred to carry out the drawing operation while maintaining the diameter constant, thereby elongating and increasing the surface area of the coated tube. This can be accomplished by conventional glass-blowing techniques, well known in the art.

In order to prevent a possible collapse of the tube during drawing, it is preferred to maintain a slight excess pressure, i.e., from about 0,01 to 1 mbar, inside the tube in order to counteract the tendency of the tube to collapse.

The use of tubes, expecially tubes of square or rectangular cross-section, is preferred, since these tubes can successfully be coated using the CVD coating process, and planar substrates can easily be produced from such tubes. A tube of rectangular or square cross-section need only be sliced at the corners, thus yielding four planar glass substrates. The separation of such tubes into components preferably takes place after the drawing operation. If round tubes are employed and it is desired to transform them into planar glass substrates, it is preferred to either soften the tubes by heating and then pressing them until they are flat, or else to cut the tubes open longitudinally and transform them into planar substrates by ironing-out. Since it is more economical to produce coated glass substrates of the largest possible size, it is preferred when making flat articles from tubes to select a tube having a cross-secitonal area as large as possible.

In a normal CVD tube-coating facility, the diameter of the tubes being coated is usually from about 15-50 mm. It is also possible to use tubes of larger diameters or cross-sectional areas, i.e., larger than 50 mm, and also use correspondingly larger coating equipment. The process of the present invention is particularly suitable for drawing or enlarging substrates which have been coated using conventional CVD processes and/or the MCVD processes because relatively thick layers can be deposited using these processes.

Substrates coated by the CVD and the MCVD processes can be fabricated with one or more dielectric layer systems and then treated according to the present invention to obtain glass substrates with dielectric layer systems thinner than previously obtainable. To simplify manufacture where coated glass substrates with a large number of optical properties must be kept on hand, glass substrates coated with only a small number of standard thicknesses of dielectric layer systems can be manufactured and stored. When there is a call for a glass substrate with a specific optical property, one of the standard coated substrates can then be treated according to the process of the present invention to modify its optical properties. When using the process of the present invention, the problems and cost of storage are minimized, since there is no longer any need to store large numbers of glass substrates with many different gauges of dielectric layer systems. The optical properties can be modified by drawing and measuring desired optical porperties, e.g., reflection or filter properties, etc., and continuing the drawing until the desired property is obtained.

Without further elaboration, it is believed that one skilled in the art can, using the preceding description, utilize the present invention to its fullest extent. The following preferred specific embodiments, therefore, are to be construed as merely illustrative and limitative of the remainder of the disclosure in any way whatsoever.

In the foregoing and in the following examples, all temperatures are set forth uncorrected in degrees Celsius; and, unless otherwise indicated, all parts and percentages are by weight.

The entire texts of all applications, patents, and publications, if any, cited above and below, and of corresponding West German Application No. P. 38 30 364.7-45, filed Sept. 7, 1988, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

EXAMPLE 1

Preparation of a dielectric mirror for 1060 nm wavelength by blowing up a coated fused silica tube.

The inner surface of a fused silica tube with 20 mm inner diameter and 30 mm outer diameter is deposited by the MCVD process with alternating layers of pure and Ge-doped films (Ge-content 20 mol-%). The layers have each additionally a small F-content (about 0,5 mol-%) to improve the viscosity behaviour. The deposition length of the tube is 70 cm. The thickness of the first $SiO_2$-layer is 2 $\mu$m. The refractive index difference of the Ge-doped layer ($n_{(1060\ nm)} = 1,49$) versus the $SiO_2$-layer ($n_{(1060\ nm)} = 1,46$) is 0,03 due to the Ge- content. So the thickness of the first Ge-doped layer (first high refractive index layer) is nearly 1,96 $\mu$m, thereby providing the same optical thickness for both layers. 300 layers (150 of each layer type) are deposited which reduce the inner diameter of the tube from 20 mm to 18,8 mm. Because the cross sectional areas of the deposited layers should be kept constant, the thicknesses of the $SiO_2$-layers increase continuously from 2 $\mu$m for the first layer to 2.13 $\mu$m for the last (150th) layer: $2 \times 20$ ≐2,13 ×18,8. The thicknesses of the Ge-doped layers increase from 1,96 μm for the first one to 2,08 μm for the last one.

The coated tube is then blown up by conventional glassmaker technique by a factor 11. The result is a tube with an outer diameter of 330 mm, whereby the thickness of the tube wall is reduced to 0,38 mm. The thickness of a Ge-doped high-refractive index layer is 1,778 nm and the thickness of a low-refractive layer is 1,815 nm, which correspond to 1060/(4×n (high, low) ) nm for n (high)=1,49 resp. n (low)= 1,46.

A piece of 10×10 cm² is sewed from the tube, heated to the softening point and flattened by pressing slightly between two polished platinum plates. The so produced multilayer is high reflecting (ca. 99 %) for radiation of 1060 nm wavelength.

EXAMPLE 2

Preparation of a dielectric mirror for 1060 nm wavelength by drawing out a coated fused silica tube.

The inner surface of a fused silica tube with 20 mm inner and 30 mm outer diameter is coated as described in example 1. The deposition length of the tube is 20 cm. The coated tube is extended in length by conventional glassmaker technique by a factor 11, whereby the inner diameter is held constant. The resulting layers had the same thickness as described in example 1. The tube is then sewed in two halfs and ironed out. The resulting dielectric mirror is high reflecting (ca. 99%) for radiation of 1060 nm wavelength.

What is claimed is:

1. In a process for producing a planar glass substrate having one or more dielectric layers of optical quality, the improvement comprising heating a glass tube having one or more dielectric layers on one or both sides of said glass tube applied by chemical vapor deposition or modified chemical vapor deposition to a sufficient temperature so that the glass tube can be blown, flowing the glass tube to expand it and reduce the thickness of the dielectric layers, measuring the optical properties of the blown glass tube and continuing to expand the tube until desired optical properties are obtained, cutting the blown glass tube and heating it to its softening point, and flattening it to produce a planar glass substrate.

2. The process according to claim 1, wherein the glass tube is expanded until the dielectric layers are from about ½ to 1/20 of their original thickness.

3. The process according to claim 1, wherein the glass tube is expanded until the thinnest individual dielectric layer is from about 0.05 to 1 micrometers thick.

4. A process according to claim 1 wherein, said glass tube has 100-1000 dielectric layers of alternating composition, each of said dielectric layers are 1-10 μm in thickness, before said glass tube is expanded.

5. A process according to claim 4, wherein the glass tube is expanded until the dielectric layers are from about ½ to 1/20 of their original thickness.

6. A process according to claim 5, said dielectric layers being:
    (a) alternating layers of $SiO_2$ doped with 0.5 mol % F., and $SiO_2$ doped with 10-20 mol % Ge and 0.5 mol % F., or
    (b) alternating layers of pure $SiO_2$ and $SiO_2$ doped with about 2 mol % F., or
    (c) alternating layers of borosilicate glasses having different refractive indices.

* * * * *